T. BROWN.
WIDE SPREAD ATTACHMENT FOR MANURE SPREADERS.
APPLICATION FILED MAR. 6, 1916.

1,247,632.

Patented Nov. 27, 1917.
4 SHEETS—SHEET 1.

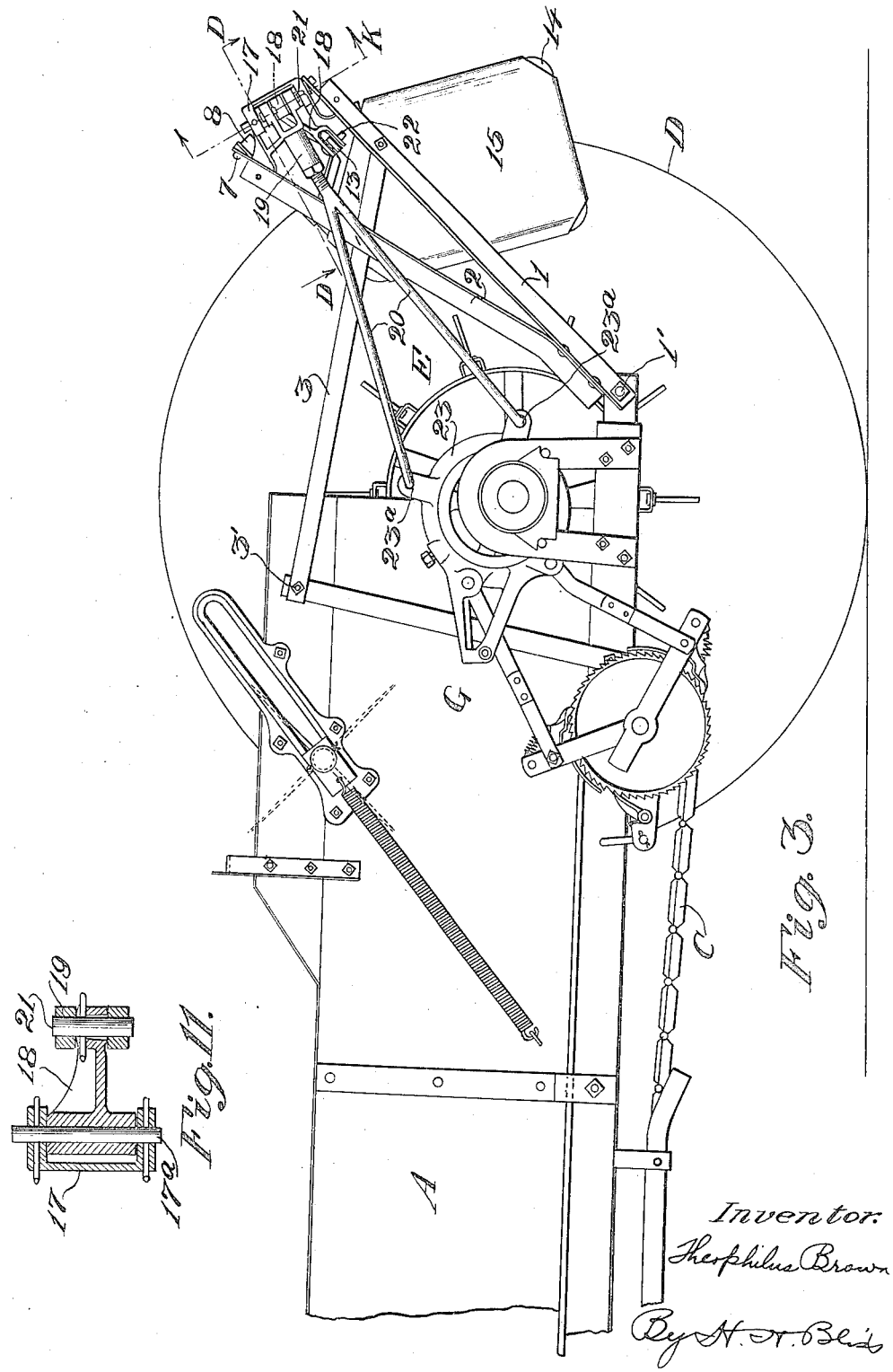

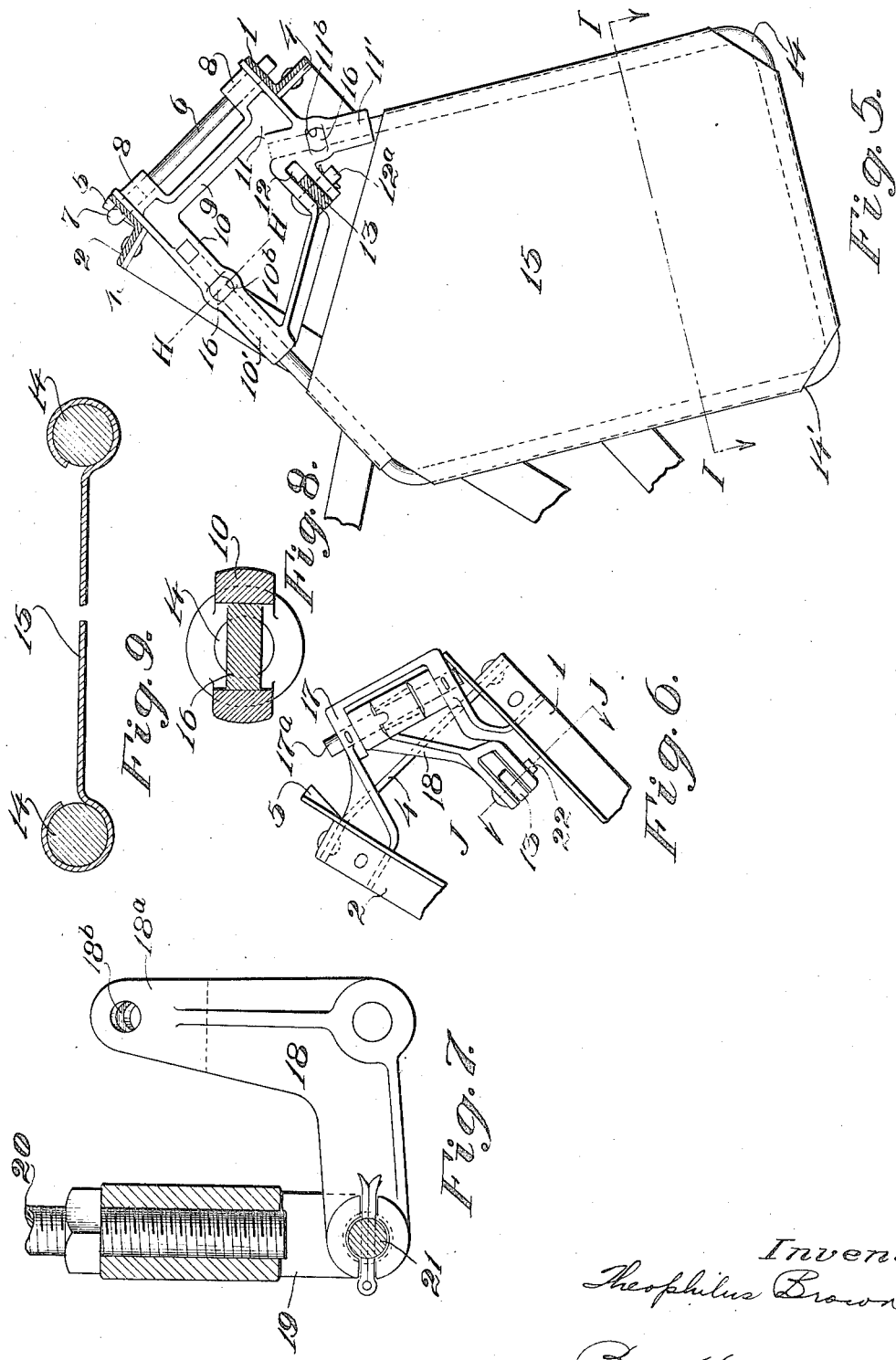

UNITED STATES PATENT OFFICE.

THEOPHILUS BROWN, OF EAST MOLINE, ILLINOIS, ASSIGNOR TO MARSEILLES COMPANY, OF EAST MOLINE, ILLINOIS, A CORPORATION OF ILLINOIS.

WIDE-SPREAD ATTACHMENT FOR MANURE-SPREADERS.

1,247,632.

Specification of Letters Patent.

Patented Nov. 27, 1917.

Application filed March 8, 1916. Serial No. 82,452.

*To all whom it may concern:*

Be it known that I, THEOPHILUS BROWN, a citizen of the United States, residing at East Moline, in the county of Rock Island and State of Illinois, have invented certain new and useful Improvements in Wide-Spread Attachments for Manure-Spreaders, of which the following is a specification, reference being had therein to the accompanying drawing.

This invention relates to improvements in manure spreaders; and particularly to devices of the class now known as "wide spreads", that is, means supplemental to the ordinary distributing beater at the rear end of the load carrying vehicle intended to take the disintegrated particles or sub-masses delivered by the beater and throw them laterally to points beyond the vertical longitudinal planes of the ends of the beater, and even to points beyond the planes of the ground wheels.

The desirable results aimed at in using these supplemental laterally throwing distributers are well known. Where a mechanism is used with a beater cylinder which is, say, fifty inches long, the width of the strip of material distributed on the ground will be of approximately that width. The beater driving ground wheels travel in vertical planes outside of the strip and, therefore, after each traverse of the machine it is necessary, when it is making the succeeding traverse, to have one of the ground wheels travel upon the manure previously spread. The traction grip of the wheel is constantly in danger of being lost, for it frequently slips and the parts, including the beater driven thereby, tend to slow down and to stop the work of distribution.

Mechanisms with the supplemental laterally acting distributers are intended to avoid this difficulty.

Again, when using a spreader in a field with rows of standing corn stumps, it is practically necessary to follow the rows of stalks. These rows are generally forty-two inches apart. If an ordinary mechanism (say, of fifty inches spread) be used, it is necessary to follow each stalk row in order to have the manure cover the entire surface. But the rows being only forty-two inches apart, it will be seen that at each traverse of the machine the side edges of one strip of distribution must overlap the side edges of the adjacent strips to the extent of several inches on each side. The objectionable result is that the fertilizer is not distributed evenly, there being left strips of approximately eight inches in width where the quantity is doubled.

If, however, use be made of a supplemental laterally acting distributer or wide spread device capable of forming a strip of fertilizer, say, eighty-four inches in width, the field can be evenly covered if the machine is driven along every other row.

The supplemental distributer that has been generally used heretofore to effect this throwing of the material laterally has had serious objections incident to it. It comprises spirally arranged blade sections carried by a rapidly rotating shaft mounted on a horizontal axis parallel to that of the main beater. To have the desired effect in projecting the particles laterally, it depends upon a high speed of rotation which must be maintained approximately constant. This, in turn, requires that the horses should move, and the ground wheels should rotate with a substantially constant speed. This, however, cannot be attained, particularly, where the ground surface varies either as to its being hilly or being uneven. In going down-hill the team has a tendency to hasten and in going up-hill, or in heavy or boggy ground, to slow down.

With these variations in the speed of advance there is a corresponding variation in the width of the distributed strip of fertilizer. It is wider and thinner where the vehicle descends or advances faster and narrower and heavier where there is an ascending surface or where there is a heavy pull for the team. These conditions result in leaving strips or patches of ground surfaces which are either unfertilized or over-fertilized.

Another objection to wide spread devices of this character is, that the blades revolve constantly in one direction, that is, continuously around their axis. Much of the disintegrated material, straws, and small lumps, is thrown upward to high planes where it is caught by the wind and shifted out of the predetermined places for its deposit. I have found that the power driven body which is to effect the lateral throwing of the particles must be capable of exerting a striking action and not have complete rotation, so that the particles will be moved laterally in low horizontal planes where they cannot be scattered undesirably by the wind.

I employ thin widely extended oscillating paddles or vanes so arranged that as they move from their normal, central position in either direction, laterally, they will be capable of imparting striking and quickly delivered blows to the particles, and I make them large enough to throw, at each movement, a large number of these particles either toward the right or toward the left.

In the drawings,

Fig. 3 is a side elevation of the parts at the rear end of the machine looking from the left;

Fig. 4 is a plan view of parts of the supplemental distributer taken on the plane of line D—D of Fig. 3;

Fig. 5 is a section on the line E—E of Fig. 2, and showing parts on a larger scale;

Fig. 6 is an end view of the bell crank for driving the supplemental distributer and of parts of the frame;

Fig. 7 shows the bell crank lever detached;

Fig. 8 is a section on the line H—H of Fig. 5;

Fig. 9 is a section on the line I—I of Fig. 5;

Fig. 10 is a section on the line J—J of Fig. 6;

Fig. 11 is a section on the line K—K of Fig. 3.

Figure 1:
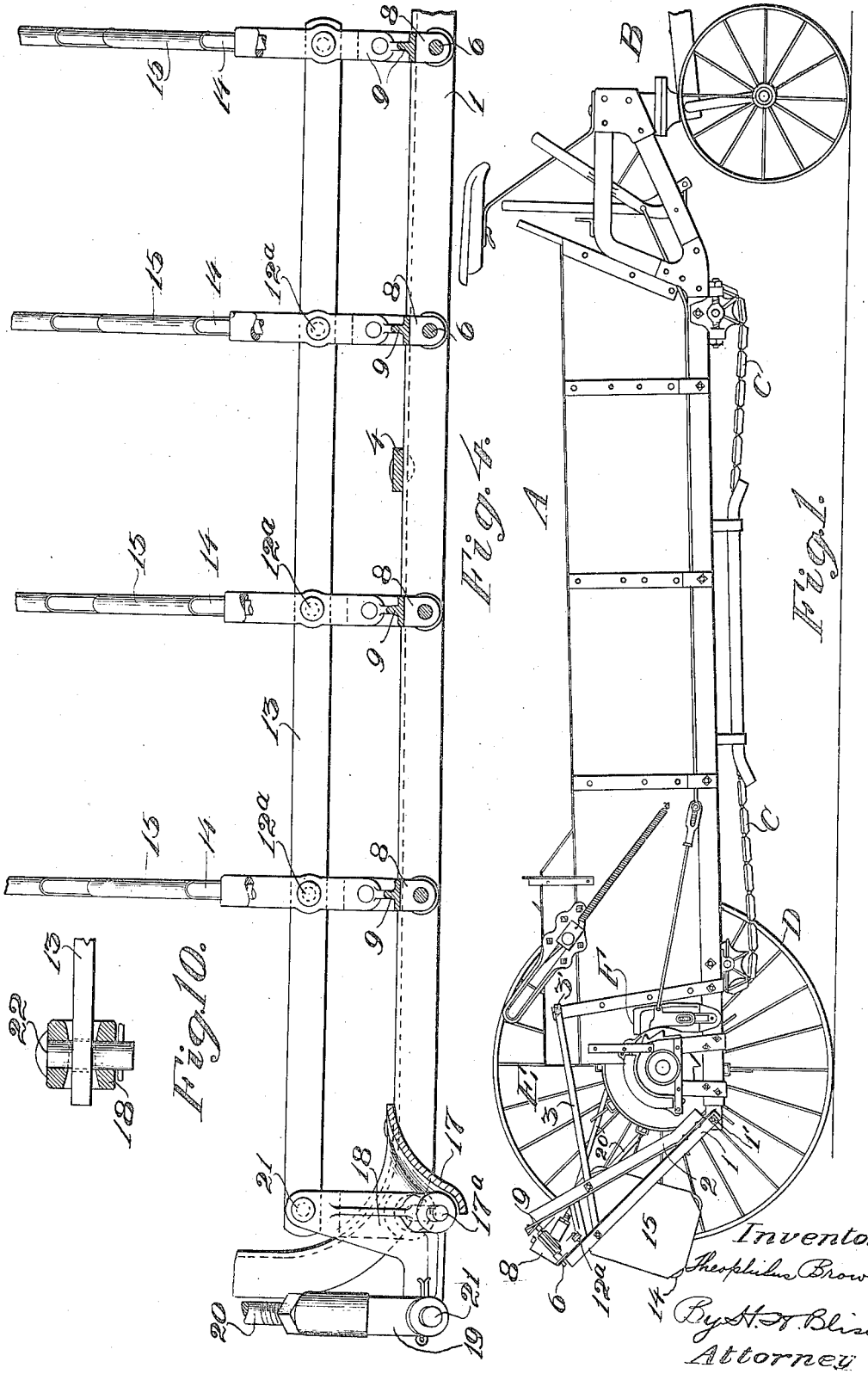
Figure 1 is a side elevation of a complete machine having my improved wide spread attachment applied thereto.

A spreading machine is illustrated in Fig. 1 which has a load carrying body A, a front truck B, an endless apron carrier C, rear ground wheels D, and the main beater E mounted on the axle of these wheels. On the right hand side, at F, is the power transmitting mechanism interposed between the ground wheels and the beater for rapidly rotating the latter and on the left hand side, at the rear end, is the mechanism (indicated by G) through which power is transmitted to the apron-driving devices.

When in operation the manure is loaded in the vehicle body A, and rests on the carrier C, which slowly moves it toward the beater E, the fingers of which rapidly tear particles or small masses off from the end of the main mass of the load and throw them upward and backward.

The details of the structure and of the mode of operation of these parts of the machine need not be described, those shown being merely typical, to give a correct understanding of the parts with which are combined the devices more particularly constituting the present improvement.

The beater cylinder acts to produce on the ground a substantially parallel sided strip of fertilizer about, say, fifty inches in width. In order to spread the stream of manure more widely, I employ the following mechanism.

The movable parts are supported on a frame which comprises the angle bars 1 and 2. Each of these is bent to provide longitudinal legs and a cross bar, see Fig. 2. They extend upward from, and are bolted at 1' to, the bottom sill parts of the main frame of the vehicle. The side parts of these bars 1 and 2 diverge upwardly and the cross parts are separated and lie in a plane inclined to the horizontal and to the vertical, see Figs. 1, 3 and 5. These bars are braced together and to the main frame by bars 3 which, at 3', are fastened to the upper part of the vehicle body. The central parts of their cross bars are braced by one or more bars, as at 4.

To the upper parallel cross parts of these frame elements 1 and 2 are secured the distributing devices.

Each of these is made as follows: A skeleton bracket having top and bottom bars 10 and 11 and connecting bars 9 is cast with sleeve bearings 8 (see Fig. 5) and with elongated tubular sockets at 10', 11'. At 10$^b$, 11$^b$, there are openings in the metal extending to the socket. A light skeleton frame is secured to this bracket, it being formed by bending a light rod 14, the ends of which are inserted in the said sockets 10$^a$ and 11$^a$ in the bracket and are then fastened by flattening the metal, as at 16, where it is exposed in the sockets.

Figure 2:
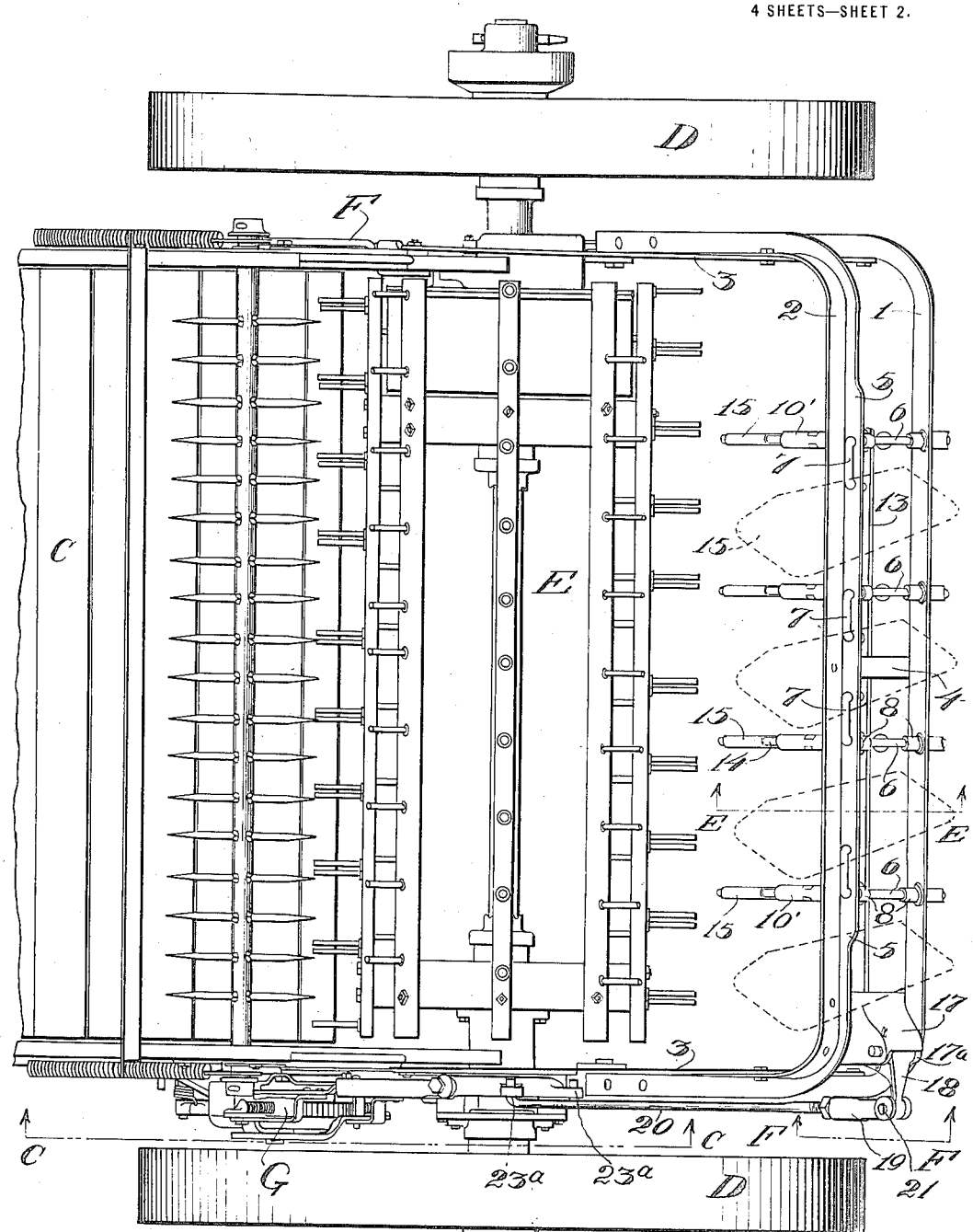
Fig. 2 is a plan view of the rear part of the machine.

The operative part, or blade, proper, 15 is formed of thin sheet metal, the edges of which are bent around the side parts of the rod frame 14. Each of these blades or vanes, with its bracket, is mounted in the space between the approximately parallel flanges of the cross parts of the frame bars 1 and 2. To bring these flanges as closely to parallelism as possible, the upper one is preferably pressed or bent downward at 5, as shown in Fig. 2. They are provided with pintle apertures, an aperture in the one alining with an aperture in the other, and after a vane bracket has been put in the position shown in Fig. 5, a hinge pintle 6 is passed through the flanges in the frame bars and through the bearings 8 of one of the vanes. The pintles are locked against rotation by providing them with bent ends, as at 7, the end parts being adapted to fit into locking apertures in the flange of the frame bar.

The vanes are caused to oscillate as follows: 13 is a power transmitting bar fitted in the seats 12 in the brackets and connected to each of the latter by a pin 12$^a$.

This bar 13 is longitudinally reciprocated by a bell crank 18, the fork 19, the pitman or connecting rod 20 and eccentric 23. The bell crank has two arms 18ᵃ and 18ᵇ. The fork 19 is connected to the arm 18ᵃ of the bell crank by the hinge pin 21 and to the pitman 20 by fitting the threaded end of the latter into a threaded sleeve on the fork. The threaded connection permits accurate adjustment when required. The pitman 20 is preferably bifurcated, both of its lower end parts being pivotally connected to the ears 23ᵃ on eccentric 23. The latter is mounted on the axis of the beater E, it preferably being the device which also imparts step by step movement, through the mechanism at G, to the feeding apron.

The bell crank 18 is supported in a bracket 17 which is secured to the top and bottom frame bars 1, 2. The legs of the bracket have apertures to receive the hinge pintle 17ᵃ upon which the sleeve part of the bearing element of the bell lever is hinged. As the lower ends of the pitman 20 depart in their movements from straight lines of travel, the sleeve of the part 18ᵃ of the bell lever is flared or made with sufficient clearance to allow freedom of movement of the fork and of the pitman without cramping or binding at the hinge. And as the arms 18ᵃ and 18ᵇ do not both vibrate in the same plane, the hinge ears of the arm 18ᵇ are shaped, as shown in Fig. 10, so as to provide clearance for any relative rocking movement of the reciprocating bar 13.

The framework and various parts of the cross spreader constitute a self-contained mechanism which can be quickly attached to the vehicle body, or detached therefrom, as desired. The frame is readily removable at any time, as it merely requires the withdrawal of the bolts at 1' and 3', releasing the braces 3 and detaching the pitman 20 from the eccentric 23. After removing the cross spreader, the main mechanism, comprising the vehicle and the beater E, is at once adapted for use in the ordinary way. There is frequent varying in the demands for spreading manure widely, on the one hand, or for spreading more narrowly, on the other, one field requiring a narrower and thicker layer of the fertilizer and the next requiring a wider and thinner one. And I believe myself to be the first to have provided the farmer with a spreading apparatus which can be quickly changed for carrying on either mode of working.

What I claim is:

1. In a manure spreading apparatus, the combination, with the load carrying vehicle, and the beater adapted to disintegrate the load mass into particles or sub-masses and propel them backward, of a transverse series of relatively elongated and widely extended swinging blades or vanes behind the beater, each arranged to have its widely extended faces lie initially in vertical planes which are longitudinal of the machine, and each supported on an axis which is inclined upward and forward and lies approximately in the said vertical longitudinal planes, and means for reciprocating all of said blades around their said inclined axes to cause all parts of their widely extended faces to rotate in planes inclined to the horizontal, whereby they lift up the particles against which the said faces impinge and propel them laterally.

2. In a manure spreading apparatus in combination, with the load carrying vehicle and the beater adapted to disintegrate the load mass into particles or sub-masses and project them backward, of a transverse series of elongated hinges on axes inclined forward and upward and lying in vertical longitudinal planes, a series of relatively elongated and widely extended swinging blades or vanes, each supported by one of said hinges and arranged to have all of its parts rotate around its axis in circles lying in planes inclined to the horizontal, and means for transversely reciprocating said blades to cause their widely extended faces to positively strike, and lift up said particles, and to propel them laterally.

3. In a manure spreading mechanism the combination, with the load carrying vehicle, and the beater adapted to disintegrate the load mass into particles or sub-masses and propel them backward, of a transverse series of relatively elongated and widely extended swinging blades or vanes each arranged to have its widely extended face lie initially in a vertical plane which is longitudinal of the machine, and each supported by an elongated hinge on an upward and forward inclined axis lying in a vertical longitudinal plane, and means for simultaneously reciprocating said blades around said hinge axes to cause their widely extended faces to positively strike, and lift up the said particles, and propel them laterally.

In testimony whereof, I affix my signature, in presence of two witnesses.

THEOPHILUS BROWN.

Witnesses:
 JESSIE SIMSER,
 W. G. DUFFIELD.